(12) United States Patent
Huang et al.

(10) Patent No.: US 6,404,549 B1
(45) Date of Patent: Jun. 11, 2002

(54) OPTICAL CIRCULATOR

(75) Inventors: Chen-Bin Huang; Wei-Jen Chou, both of Hsinchu; Chieh Hu, Taichung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/659,123

(22) Filed: Sep. 11, 2000

(30) Foreign Application Priority Data

Jun. 7, 2000 (TW) ........................................ 89111017 A

(51) Int. Cl.⁷ .................................................. G02B 5/30
(52) U.S. Cl. ...................... 359/484; 359/487; 359/495; 359/497; 359/281; 385/11; 385/31
(58) Field of Search ................................. 359/484, 487, 359/495, 497; 385/11, 31

(56) References Cited

U.S. PATENT DOCUMENTS

| | | | | |
|---|---|---|---|---|
| 5,471,340 A | * | 11/1995 | Cheng et al. | 359/484 |
| 5,689,360 A | * | 11/1997 | Kurata et al. | 359/497 |
| 5,724,165 A | * | 3/1998 | Wu | |
| 5,768,005 A | * | 6/1998 | Cheng et al. | 385/11 |
| 5,878,176 A | * | 3/1999 | Cheng | 385/11 |
| 5,905,823 A | * | 5/1999 | Shintaku et al. | 385/11 |
| 5,930,418 A | * | 7/1999 | Chang | 385/11 |
| 5,930,422 A | * | 7/1999 | Cheng | 359/495 |
| 5,933,269 A | * | 8/1999 | Robinson | |
| 6,014,244 A | * | 1/2000 | Chang | 385/11 |
| 6,049,427 A | * | 8/2000 | Bettman | 359/484 |
| 6,111,695 A | * | 8/2000 | Lee et al. | 359/484 |
| 6,154,581 A | * | 11/2000 | Lu et al. | 359/484 |

FOREIGN PATENT DOCUMENTS

| | | | | |
|---|---|---|---|---|
| JP | 409318913 | * | 12/1997 | 359/484 |
| JP | 410048572 | * | 2/1998 | 359/484 |

* cited by examiner

Primary Examiner—Ricky D. Shafer
(74) Attorney, Agent, or Firm—W. Wayne Liauh

(57) ABSTRACT

The invention provides an optical circulator that comprises three ports with the property that light entered through the nth port is output through the (n+1)th port. It can be applied to optical fiber transmission of optical signals. It uses a reflector to make a two-core fiber collimator to be a first port and a second port of the optical circulator so as to minimize the optical circulator volume and to simplify the assembly procedure. A reciprocal crystal and a non-reciprocal crystal are combined to form an optical polarization controller to conquer such technical problems as the conjugate angle of the two-core collimator and the minimal polarization mode dispersion. In particular, the corresponding relation between the Faraday rotator and the birefringent crystal optical axis can be utilized to remove half-wave plates used in ordinary optical circulators, thus lowering manufacturing costs and complexities.

26 Claims, 10 Drawing Sheets

OPTICAL CIRCULATOR

BACKGROUND OF THE INVENTION

1. Field of Invention

The present invention relates to an optical circulator and, in particular, to an optical circulator that couples optical fibers with optical devices and can be applied to optical fiber transmission of optical signals.

2. Related Art

An optical circulator is a passive device that has at least three ports for accepting optical fibers. It is featured in that light that enters the circulator through the first port exits through the second port, and light that enters through the second port exits through the third. When the number of ports increases, this principle stays the same. That is, the optical path is not retraceable in the optical circulator, light that enters the nth port exits through the (n+1)th port.

Circulators are used for fiber transmission of optical signals. For example, the first ports of two optical circulators may be connected to a data transmitter, the second ports to an optical fiber, and the third ports to a data receiver. The same fiber is then used for transmitting and receiving signals.

For anisotropic birefringent crystals, incident light can be classified into extraordinary ray (E-ray) and ordinary ray (O-ray) according to its polarization direction and those two polarization directions are orthogonal. For a linearly polarized beam, the two polarization directions differ by 90 degrees. The O-ray will obey the Snell's law and the wave propagating direction will be parallel to the energy propagating direction. However, the wave propagating direction of the E-ray is normally not parallel to the O-ray and the energy propagating direction usually differs due to the crystal optical axis. This is called the walk-off phenomenon.

When light passes through a reciprocal crystal in the forward optical path, the polarization direction will be rotated by a certain angle; whereas when the light passes through the reciprocal crystal again in the returning path, the polarization direction will be rotated back by the same angle. So the polarization of the light is not changed after the round trip. On the other hand, when light passes through a non-reciprocal crystal in the forward optical path, the polarization direction is rotated by a certain angle; whereas when the light passes through the non-reciprocal crystal in the returning path again, the polarization direction is rotated further by the same angle. Therefore, the change in the polarization of the light is additive in the round trip of the beam. A proper combination of reciprocal crystals and non-reciprocal crystals can generate a particular linearly polarized direction and allow the choice of producing the walk-off phenomenon in order to achieve the above goal of an irretraceable optical path inside the optical circulator. Normal optical circulators use half-wave plates as the reciprocal crystals but not the Faraday rotators, which are non-reciprocal crystals.

The design of optical circulators is in whether each port can be distinguished from one another by its axial direction. When different ports of the optical circulator are not in the same axial direction, a polarizing beam splitter (PBS) has to be employed. The product occupies a large volume and costs more, e.g. the technology disclosed in the U.S Pat. No. 5,878,176. To reduce the volume and cost of the product, having different ports in the same axial direction has become the trend of modern designs; see for example the U.S. Pat. No. 5,930,422. Based upon the consideration of lower costs and convenient assembly, the U.S. Pat. No. 5,973,832 discloses a technology to remove half-wave plates by using the relative angle between a multi-layer Faraday rotator and a birefringent crystal optical axis. The U.S. Pat. No. 6,002,512 discloses a technology to reduce the number of half-wave plates used by employing latchable Faraday rotators. The U.S. Pat. No. 5,930,039 discloses a two-core fiber collimator that makes the three ports only need two optical fiber collimators, greatly minimizing the product volume and lowering the manufacturing cost.

SUMMARY OF THE INVENTION

The object of the invention is to provide an optical circulator that reduces the volume, lower the cost and solve such problems as the conjugate angle of the two-core collimator and the minimal polarization mode dispersion.

According to the technology disclosed herein, the first port and the second port of the optical circulator are both become a two-core optical fiber collimator using a reflector. Since the same crystal is used repeatedly in the optical path, the volume of the optical circulator can be decreased and the assembly procedure can be simplified. It can further conquer such problems as the conjugate angle of the two-core collimator and the minimal polarization mode dispersion (PMD). Using the property that the polarization state of a light beam will not change when passing through a reciprocal crystal back and forth once, while will change additively when passing through a non-reciprocal crystal back and forth once, the present invention properly combine reciprocal crystals and non-reciprocal crystals to generate a particular polarization direction, to allow the choice of producing the walk-off phenomenon, and to form an optical circulator with an irretraceable optical path therein. In particular, the corresponding relation between the Faraday rotator and the birefringent crystal optical axis can be utilized to remove half-wave plates used in ordinary optical circulators, thus lowering manufacturing costs and complexities.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
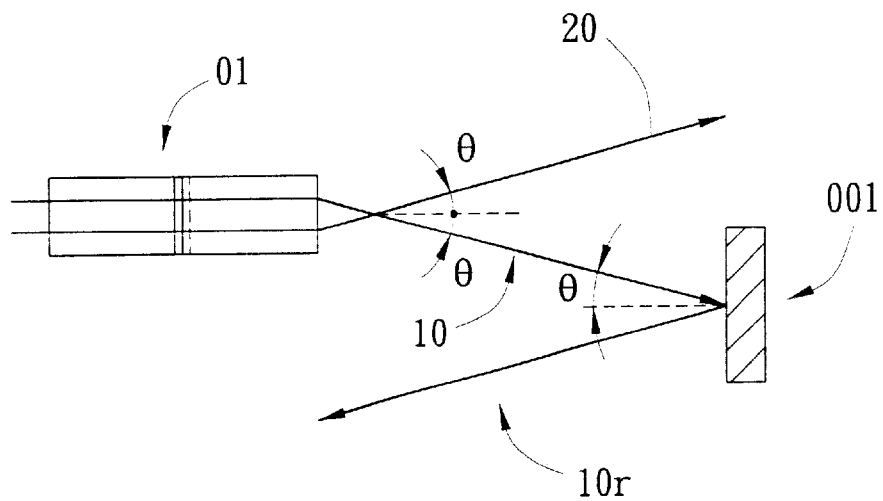
FIG. 1A is a schematic view of the reflector.

Referring to FIG. 1A, the optical path 10 for one port of a two-core optical fiber collimator 01 subtends an angle 2Θ with the optical path 20 for another port. The optical path 10 is reflected into a reflected beam 10r by a reflector 001 according to the principle that the incident angle is equal to the reflecting angle. The reflected beam is then parallel to the other optical path 20 but in the opposite direction. They have a relative displacement in their perpendicular direction.

Figure 1B:
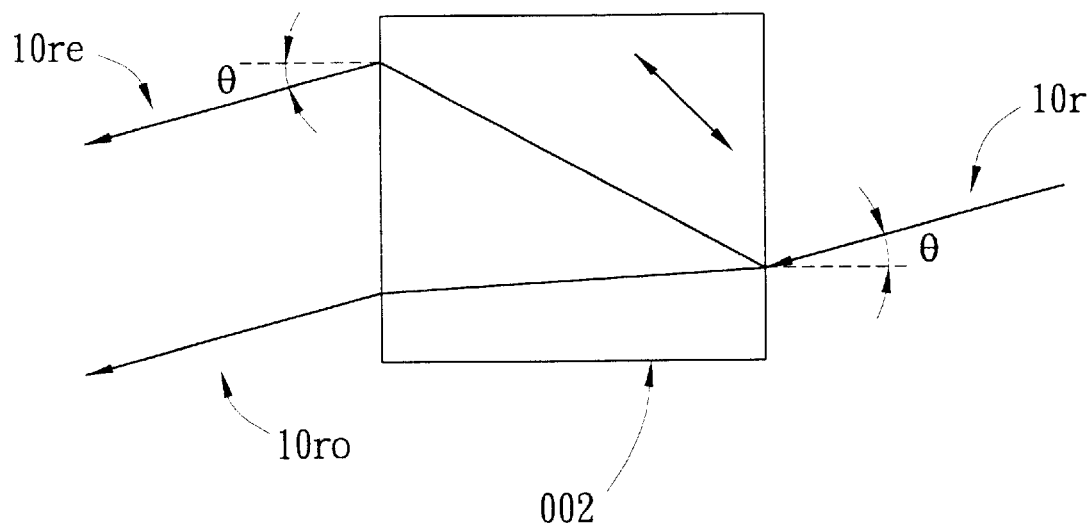
FIG. 1B is a schematic view of the birefringent crystal.

Referring to FIG. 1B, when the reflected beam 10r hits a birefringent crystal 002, the E-ray with a polarization direction parallel to the optical axis generates a walk-off phenomenon and gets a displacement. Beams 10re, 10ro outside the birefringent crystal 002 are parallel to each other and propagate in the same direction as the beam 10r.

Figure 2:
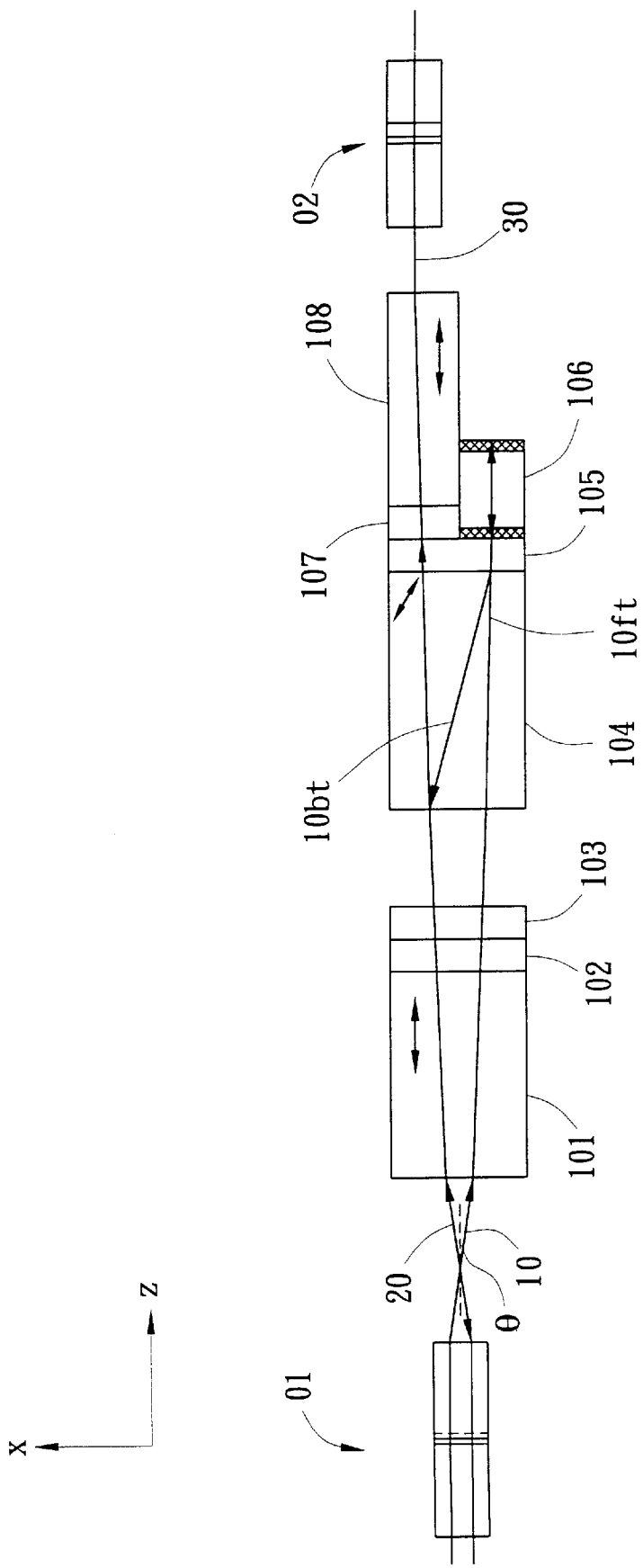
FIG. 2 shows an optical path in the x-z plane according to the invention.

Referring to FIG. 2, for the incident light entering the first birefringent crystal 101 from the first port optical path 10, the optical axis is parallel to the z-axis on the x-z plane. Therefore, there is no walk-off problem. The optical axis of the second birefringent crystal 104 keeps an angle of 45 degrees with the z-axis on the x-z plane. But through the combination of reciprocal and non-reciprocal effects by the Faraday rotator set 102 and the half-wave plate 103, the entering optical path 10ft to the first port is an O-ray, obeying the Snell's law. The beam 10ft that passes through the Faraday rotator set 105 will travel in the z direction after the reflection by the reflector 106 and pass through the Faraday rotator set 105 again. Since the Faraday rotator set is non-reciprocal, the round trip additively changes the polarization state. The beam that passes through the crystal 104 will become an E-ray that will produce the walk-off phenomenon, with an optical path 10bt. By adjusting the length of the birefringent crystal 104, the displacement of the optical path 10bt in the x direction can be controlled so as to enter the optical path 20 of the second port. The second port optical path 20 for the incident beam traveling toward the crystal 104 in the +z direction is the same as the one from the first port 10 to the second port 20. It still obeys the Snell's law and keeps moving in the +z direction after passing through the Faraday rotator set 105. It will pass through a half-wave plate 107 and a Faraday rotator set 105 and enters an optical fiber collimator 02.

Figure 3:
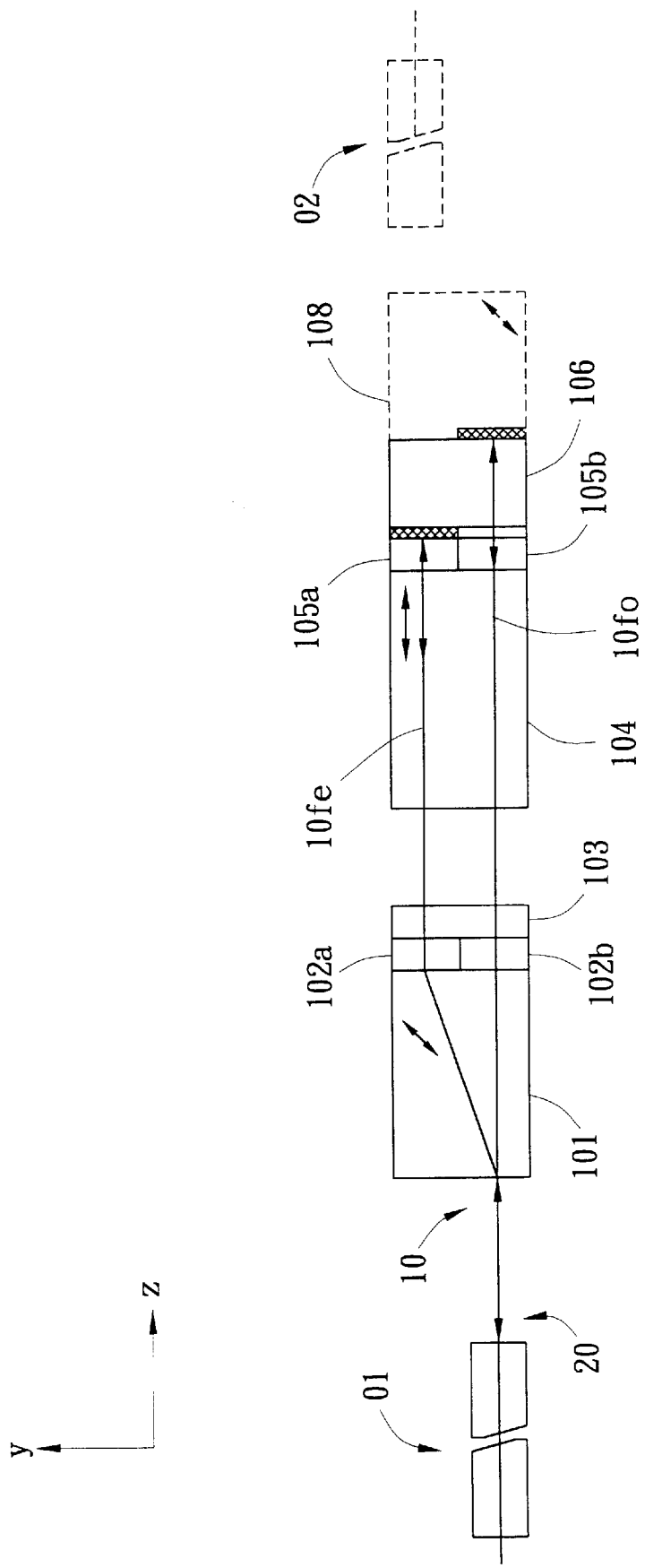
FIG. 3 shows an optical path in the y-z plane when light enters the second port from the first port a cord into the invention.

Referring to FIG. 3, the items denoted 102a and 105a are Faraday rotators that rotate the polarization direction of the light passing through them counterclockwise by 45 degrees. The first port optical path 10 perpendicularly enters the first birefringent crystal 101. The optical axis has an angle of 45 degrees with the z-axis. There will be walk-off phenomena occurring on two perpendicular optical paths of two polarization directions on the y-z plane. The two optical paths are 10fo and 10fe. The beam 10fe, an E-ray type beam, does not change its polarization direction after passing through the Faraday rotator 102a and the half-wave plate 103. The polarization direction of the beam 10fe, an O-ray type beam, will rotate by 90 degrees after passing through the Faraday rotator 102b and the half-wave plate 103. This change in the polarization direction is shown in details in FIG. 5a. At the moment, the beams 10fo and 10fe will have the same polarization direction and are O-rays for the second birefringent crystal 104. The beam 10fe is reflected by the reflector 106 after passing through the Faraday rotator 105a and re-enters the Faraday rotator 105a. The beam 10fo travels an extra distance after passing through the Faraday rotator set 105, gets reflected by the lower portion of the reflector 106 and then re-enters the Faraday rotator 105b. The disclosed invention utilizes this extra optical path covered by the beam 10fo to compensate the optical path difference between the beams 10fo and 10fe in the first birefringent crystal 101. This method can effectively solve the technical problem of polarization mode dispersion (PMD).

The polarization directions of the beams 10fo and 10fe traveling along the z direction are rotated by 90 degrees due to non-reciprocal effects. They are both E-rays for the second birefringent crystal 104 and thus will generate walk-off phenomena. The polarization of the beam 10fe in the z direction will rotate another 90 degrees after passing through the half-wave plate 103 and the Faraday rotator 102a, whereas that of the beam 10fo will stay the same after passing through the half-wave plate 103 and the Faraday rotator 102a. Therefore, the beam 10fe traveling in the z direction will generate walk-off phenomena after passing through the first birefringent crystal 101, which can couple with the beam 10fo and enter the second port.

Figure 4:
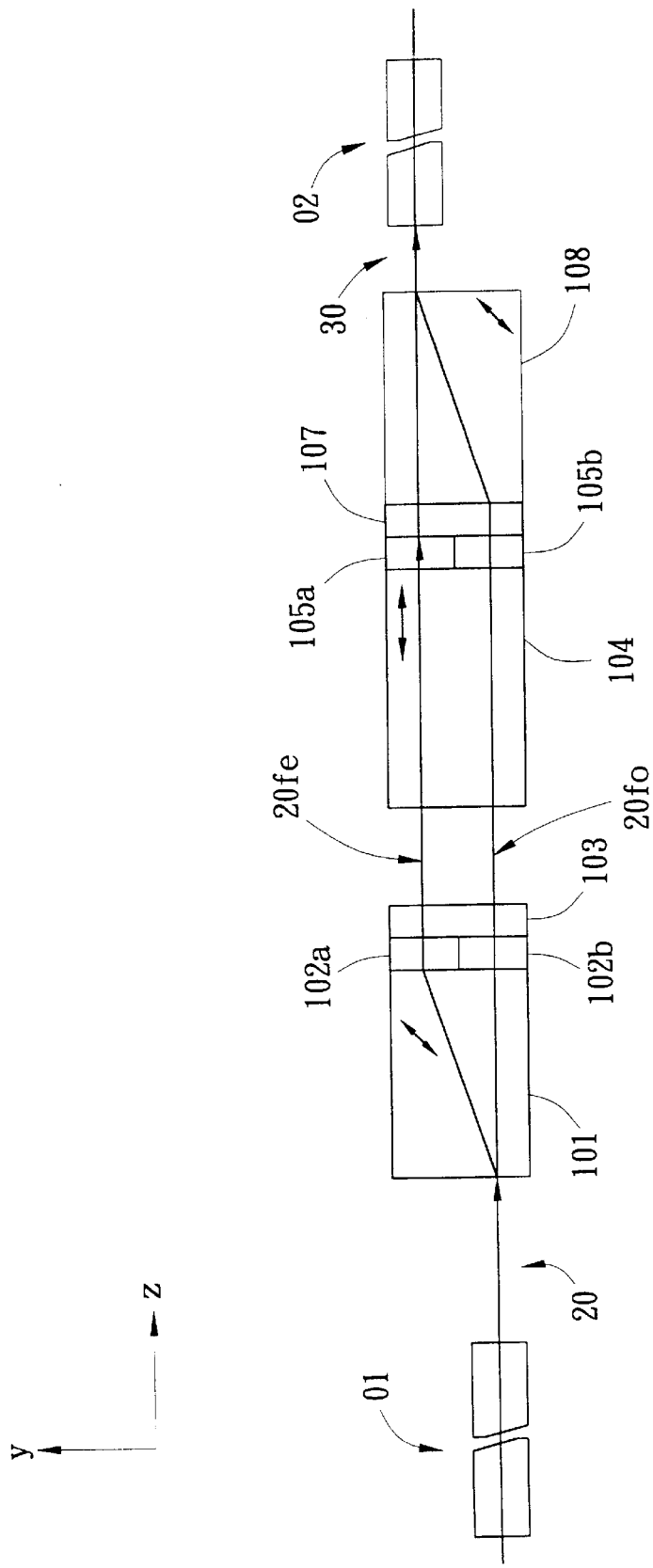
FIG. 4 shows an optical path in the y-z plane when light enters the third port from the second port according to the invention.

Referring to FIG. 4, the light emanating from the second port optical port 20 has the same optical path as that in FIG. 3 before passing through the Faraday rotator 105a, 105b. The polarization relation is shown in FIG. 5, wherein the beams 20fe and 20fo are not reflected. The beam 20fe goes through the Faraday rotator 104a and the half-wave plate 107 and the polarization direction rotates by 90 degrees. It is an O-ray when entering the third birefringent crystal 108. The polarization of the beam 20fo does not change after passing through the Faraday rotator 105b and the half-wave plate 107. When entering the third birefringent crystal 108 it is an E-ray that produces walk-off phenomena and combine with the beam 20fe to form the second port optical path 30.

Figure 5A:
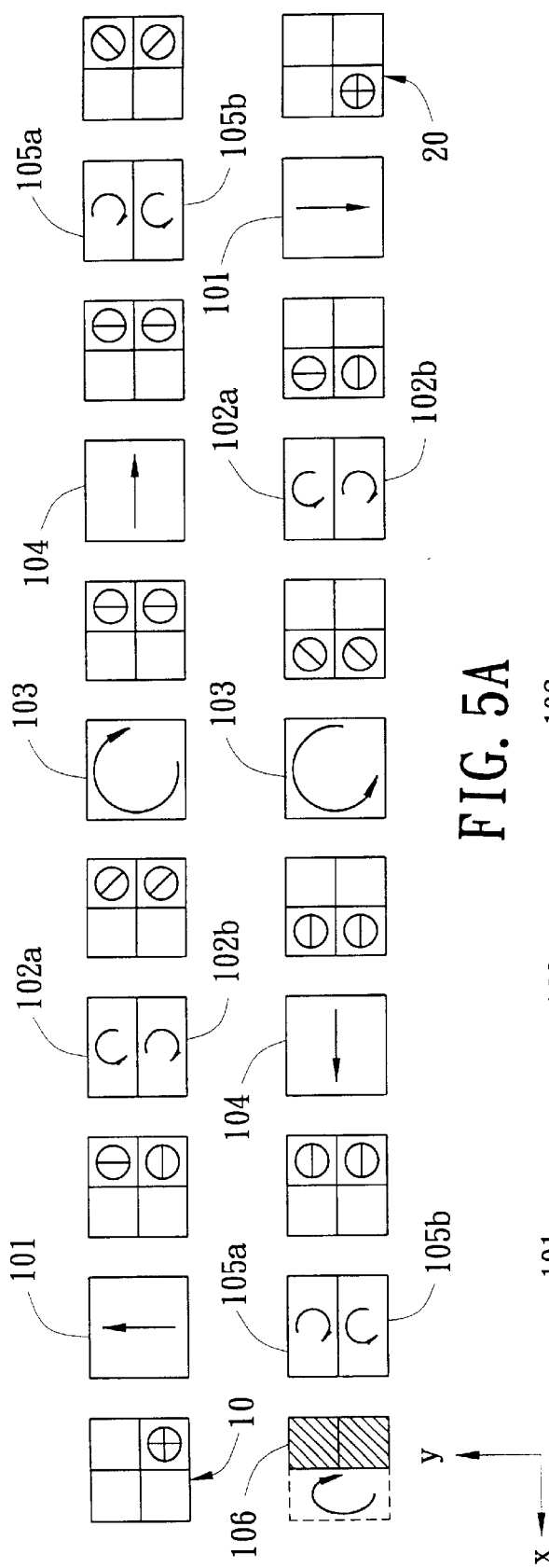
FIG. 5A shows the polorization relation of the first port optical path viewing from the x-y plane toward the positive z-axis.

Referring to FIG. 5A, it shows the polarization relation of the first port optical path viewing from the x-y plane toward the positive z-axis.

The first port optical path 10 perpendicularly enters the first birefringent crystal 101. The entering beam is divided into two perpendicular beams 10fo and 10fe due to the walk-off phenomenon. The beam 10fe does not change its polarization direction after passing through the Faraday rotator 102b and the half-wave plate 103. The polarization direction of the beam 10fo rotates by 90 degrees after passing through the Faraday rotator 102b and the half-wave plate 103. The beams 10fo and 10fe are the same polarization direction O-rays for the second birefringent crystal 104. The beam 10fe is reflected by the reflector 106 after passing through the Faraday rotator 105a and re-enters the Faraday rotator 105a. The beam 10fo travels an extra distance after passing through the Faraday rotator 105b, gets reflected by the lower portion of the reflector 106 and then re-enters the Faraday rotator 105b. The invention utilizes this extra optical path covered by the beam 10fo to compensate the optical path difference between the beams 10fo and 10fe in the first birefringent crystal 101.

Figure 5B:
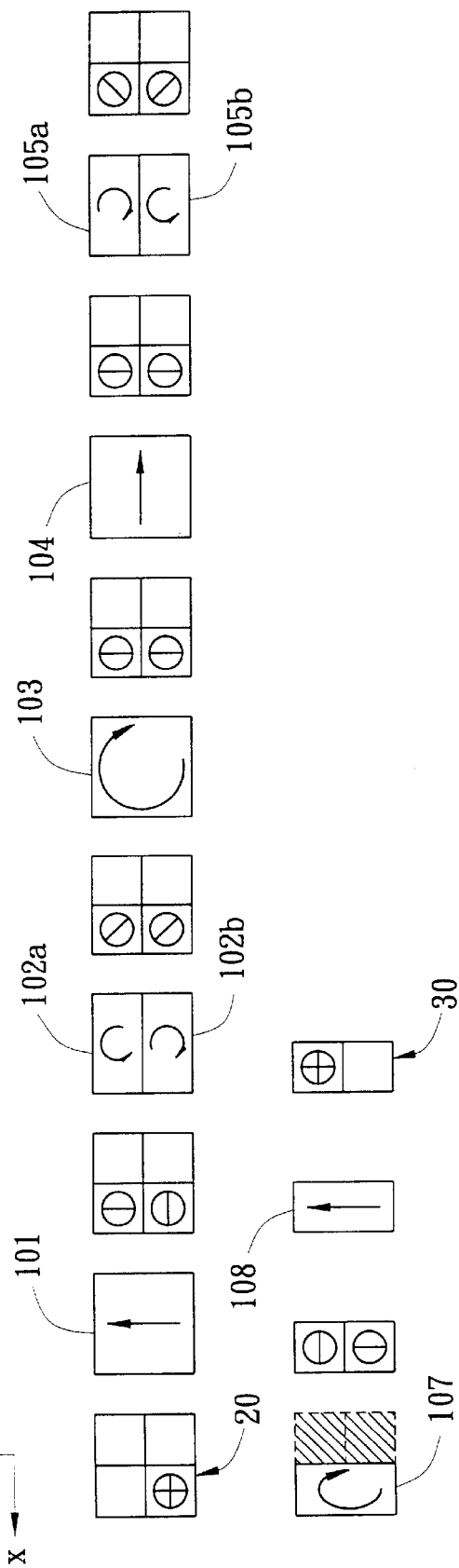
FIG. 5B shows the polarizaon relation of the second port optical path viewing from the x-y plane toward the positive z-axis.

Referring to FIG. 5B, it shows the polarization relation of the second port optical path viewing from the x-y plane toward the positive z-axis.

The second port optical path 20 perpendicularly enters the first birefringent crystal 101. The entering beam is divided into two perpendicular beams 20fo and 20fe due to the walk-off phenomenon. The beam 20fe goes through the Faraday rotator 105a and the half-wave plate 107 and the polarization direction rotates by 90 degrees. It is an O-ray when entering the third birefringent crystal 108. The polarization of the beam 20fo does not change after passing through the Faraday rotator 105b and the half-wave plate 107. When entering the third birefringent crystal 108 it is an E-ray that produces walk-off phenomena and combine with the beam 20fe to form the second port optical path 30.

Figure 6:
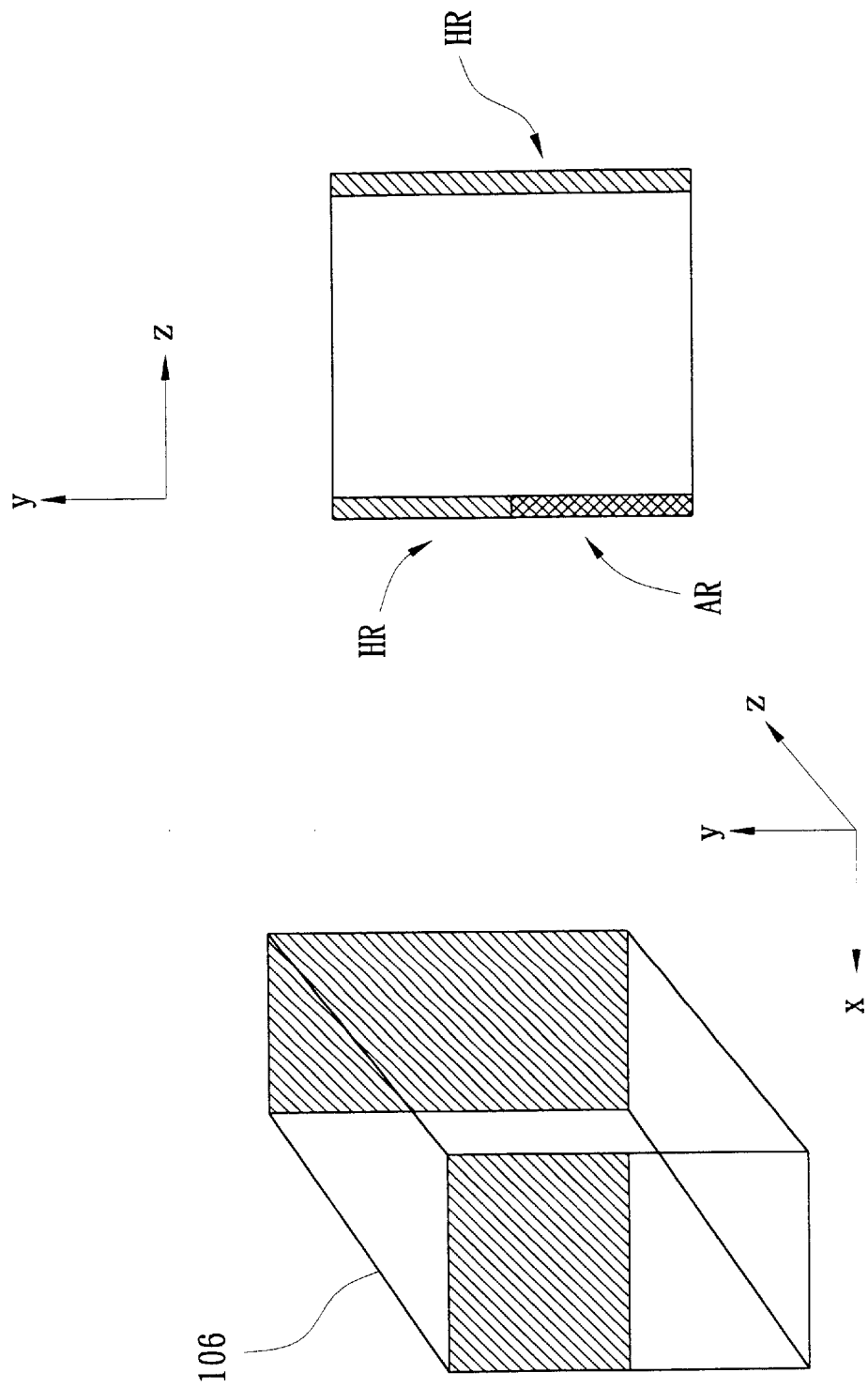
FIG. 6 is a schematic view of a reflector with the PMD compensation method.

Referring to FIG. 6, it shows a schematic view of a reflector with the PMD compensation method.

In the PMD compensation method, one portion of one surface of the reflector is coated with an HR film to reflect E-rays while the other portion is coated with an AR film for O-rays to pass through. The other surface as a whole is coated with an HR film for reflecting O-rays.

Figure 7:
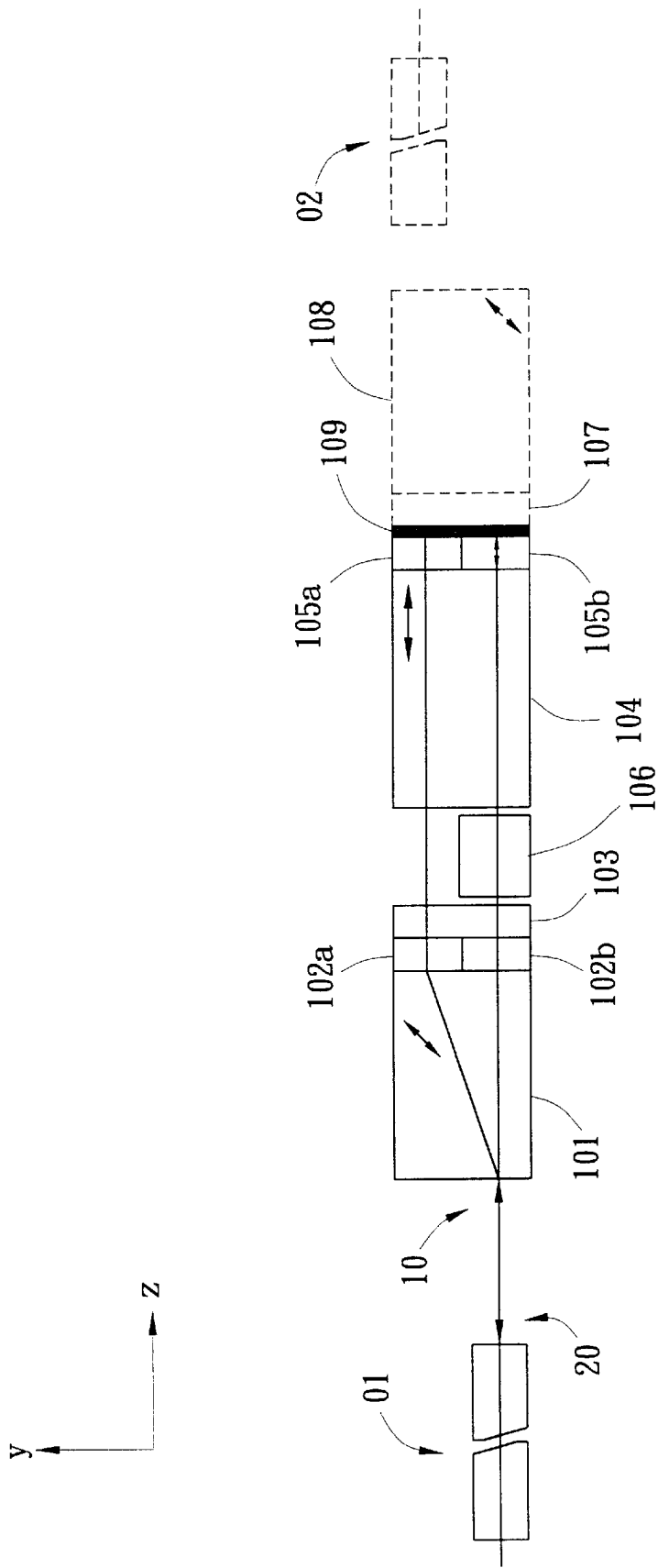
FIG. 7 is another design of the PMD compensation method.

Referring to FIG. 7, it shows another design of the PMD compensation method.

In this PMD compensation method, both surfaces of the reflector 106 are coated with AR films placed between the half-wave plate 103 and the second birefringent crystal 104. A reflector 109 with coated with an HR film is placed after the Faraday rotators 105a, 105b.

Figure 8A:
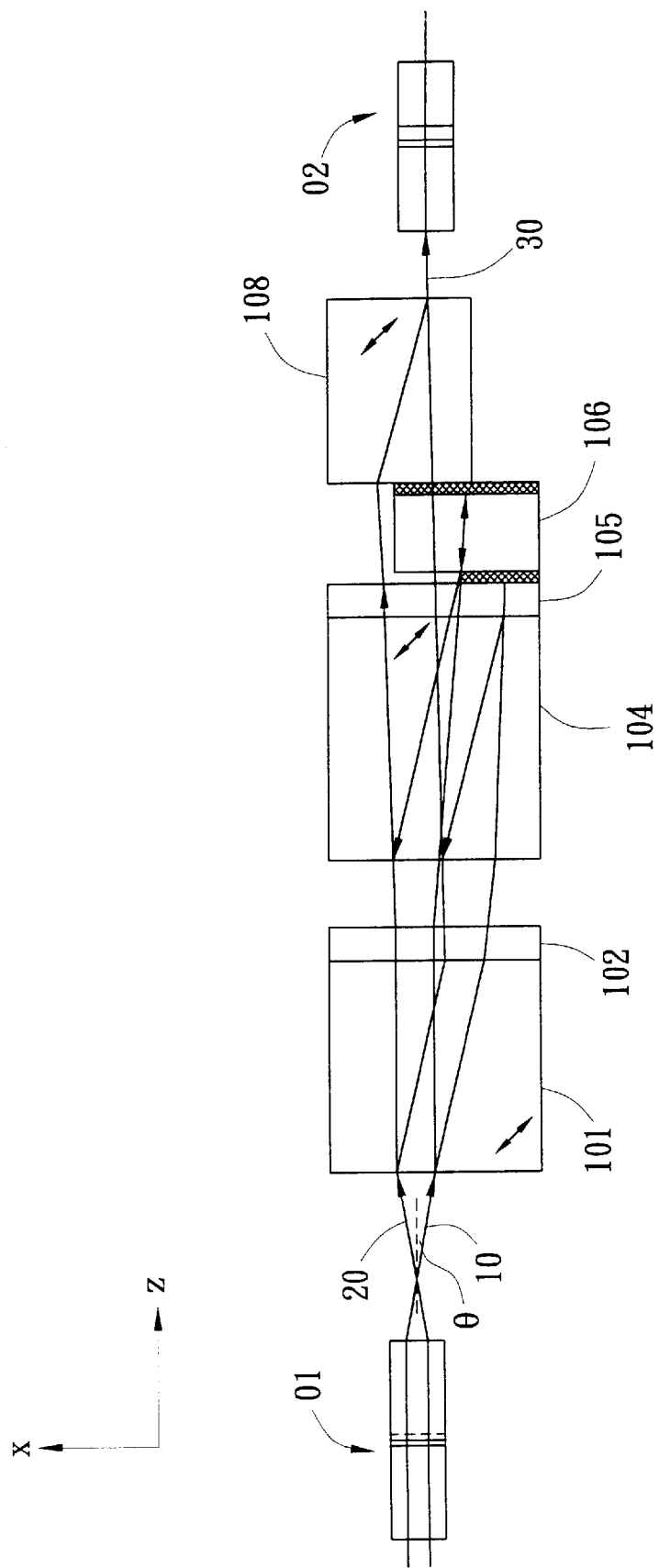
FIG. 8A shows the optical path in the x-z plane that uses a PMD compensation reflector and no half-wave plates.

Referring to FIG. 8A, it shows optical paths in the x-z plane that use a PMD compensation reflector and no half-wave plates.

The optical axes of the first birefringent crystal 101 and the third birefringent crystal 108 on the x-y plane and the x-z plane are adjusted to have an angle of 45 degrees with the y axis and the z axis, respectively. Due to the reflection principle, reciprocal crystals can be omitted. Two sets of counterclockwise and clockwise rotating non-reciprocal crystals can be employed to achieve the goal of polarization control. Through such designs, the present invention has the advantages of fewer crystals and simpler assembly.

Figure 8B:
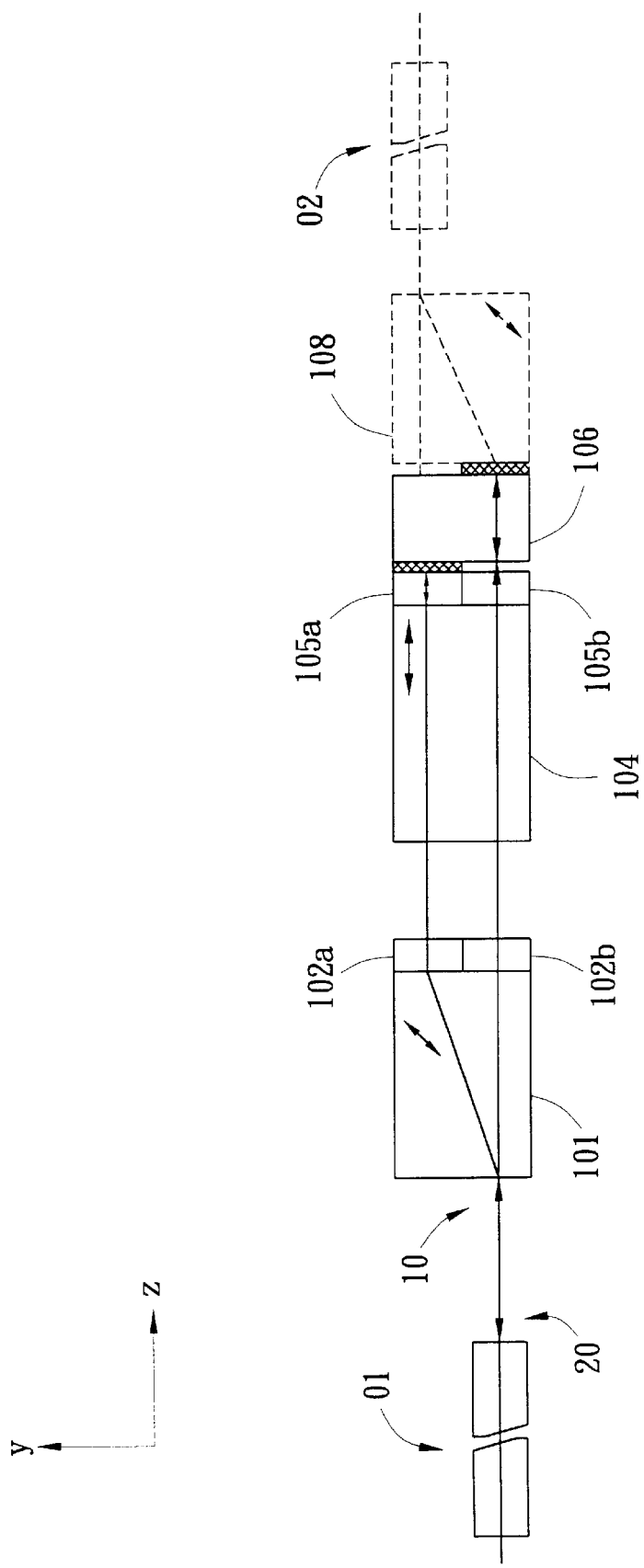
FIG. 8B shows the optical path in the y-z plane that uses a PMD compensation reflector and no half-wave plates.

Referring to FIG. 8B, it shows optical paths in the y-z plane that use a PMD compensation reflector and no half-wave plates.

The optical axes of the first birefringent crystal 101 and the third birefringent crystal 108 on the x-y plane and the x-z plane are adjusted to have an angle of 45 degrees with the y axis and the z axis, respectively. Due to the reflection principle, reciprocal crystals can be omitted. Two sets of counterclockwise and clockwise rotating non-reciprocal crystals can be employed to achieve the goal of polarization control. Through such designs, the present invention has the advantages of fewer crystals and simpler assembly.

Figure 9A:
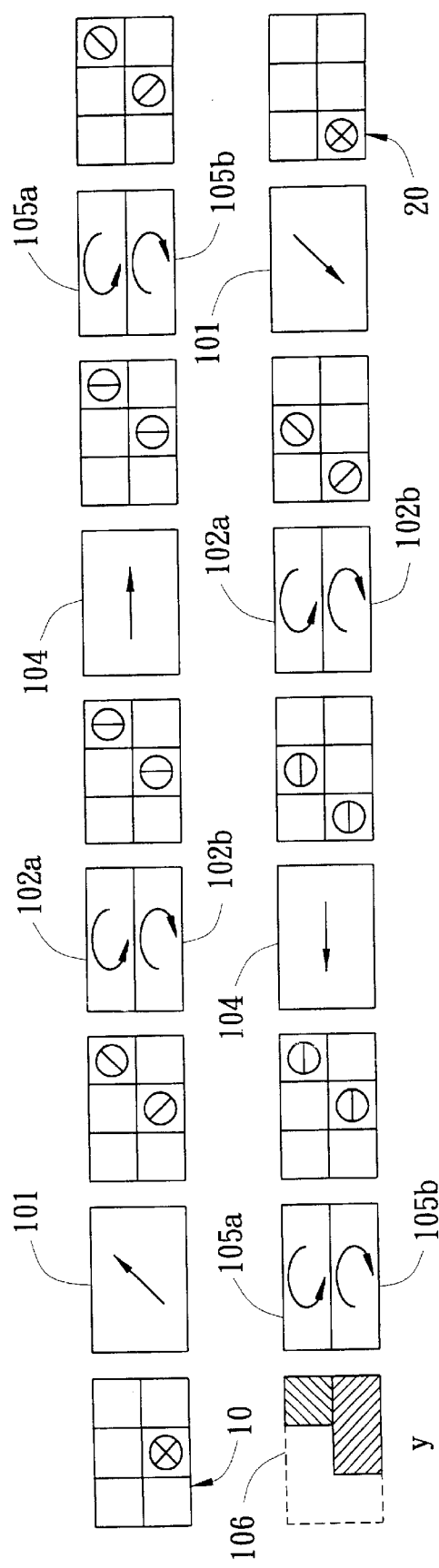
FIG. 9A shows the polarization relation of the first port optical path viewing from the x-y plane toward the positive z-axis for the design with no half-wave plate according to the invention.

Referring to FIG. 9A, it shows the polarization relation of the first port optical path viewing from the x-y plane toward the positive z-axis for the design with no half-wave plate according to the invention.

The entering beam is divided into two perpendicular beams 10fo and 10fe due to the walk-off phenomenon. The polarization direction of the beam 10fe rotates by −90 degrees after passing through the set of Faraday rotators 102a and 105a. The polarization direction of the beam 10fo rotates by 90 degrees after passing through the set of Faraday rotators 102b and 105b. The beams 10fo and 10fe are the same polarization direction O-rays for the second birefringent crystal 104. The beam 10fe is reflected by the reflector 106 after passing through the Faraday rotator 105a and re-enters the Faraday rotator 105a. The beam 10fo travels an extra distance after passing through the Faraday rotator set 105b, gets reflected by the lower portion of the reflector 106 and then re-enters the Faraday rotator 105b. The invention utilizes this extra optical path covered by the beam 10fo to compensate the optical path difference between the beams 10fo and 10fe in the first birefringent crystal 101.

Figure 9B:
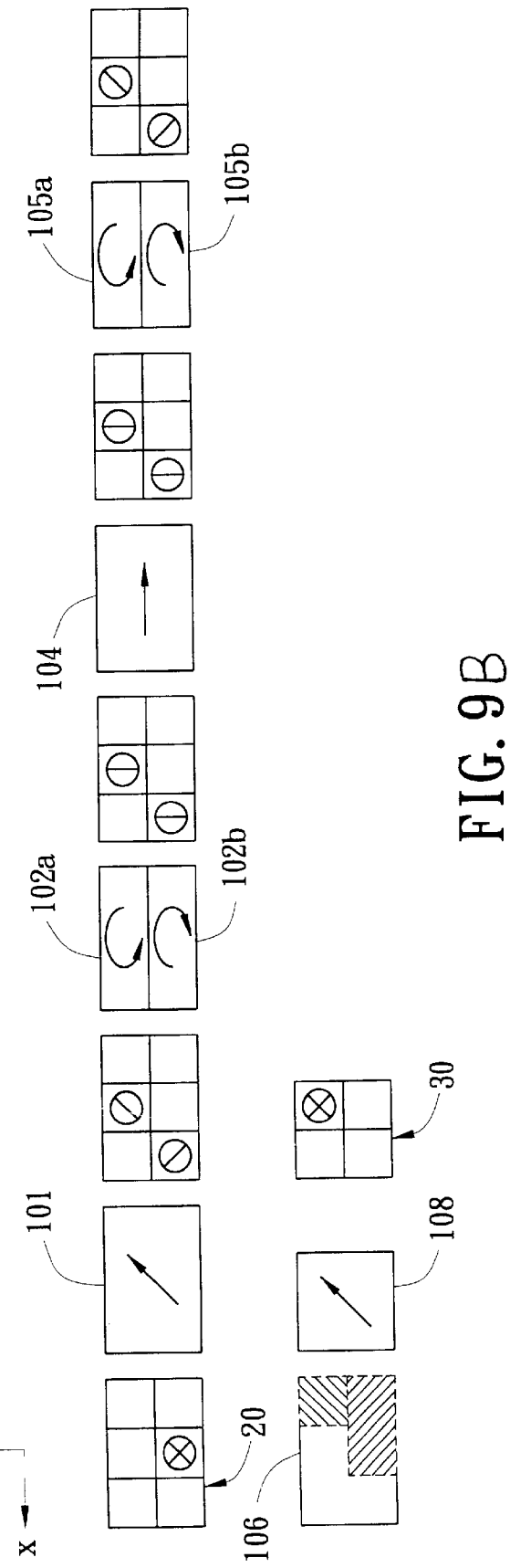
FIG. 9B shows the polarization relation of the second port optical path viewing from the x-y plane toward the positive z-axis for the design with no half-wave plate according to the invention.

Referring to FIG. 9B, it shows the polarization relation of the second port optical path viewing from the x-y plane toward the positive z-axis for the design with no half-wave plate according to the invention.

The second port optical path 20 perpendicularly enters the first birefringent crystal 101. The entering beam is divided into two perpendicular beams 20fo and 20fe due to the walk-off phenomenon. The polarization direction of the beam 20fe rotates by −90 degrees after passing through the set of Faraday rotators 102a and 105a. The polarization direction of the beam 20fo rotates by 90 degrees after passing through the set of Faraday rotators 102b and 105b. The beam 20fo is an E-ray while entering the third birefringent crystal 108. It combines with the beam 20fe to form the second port optical path 30 due to the walk-off phenomena.

Two sets of counterclockwise and clockwise rotating non-reciprocal crystals can be employed to achieve the goal of polarization control. The drawing shows the polarization relation.

Effects of the Invention

The present invention is an optical circulator. Since crystals are used repeatedly, the optical circulator volume can be minimized and the assembly procedure can be simplified. The disclosed can further conquer such technical problems as the conjugate angle of the two-core collimator and the minimal polarization mode dispersion. In particular, the corresponding relation between the Faraday rotator and the birefringent crystal optical axis can be utilized to remove half-wave plates used in ordinary optical circulators, thus lowering manufacturing costs and complexities.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical circulator for transmitting light beams in circulation, comprising:
   a beam input having a first port and a second port;
   a beam output having a third port;
   a first light split/combine controller disposed between the beam input and the beam output, said first light split/combine controller comprising a first light split controller and a first light combine controller for separating a beam into an E-ray and an O-ray with perpendicular polarization directions and for combining the E-ray and O-ray with perpendicular polarization directions into one beam, respectively;

a light displacement controller, which is disposed after the first light split controller and first light combine controller, to selectively induce a lateral displacement;

a second light split/combine controller disposed between the light displacement controller and the beam output, said second light split/combine controller comprising a second light split controller and second light combine controller for separating a beam into an E-ray and an O-ray with perpendicular polarization directions and for combining the E-ray and O-ray with perpendicular polarization directions into one beam, respectively;

a first light polarization controller, which is disposed between the first light split/combine controller and the light displacement controller for making two beams with perpendicular polarization directions travel in parallel and for making the polarization directions of the two beam traveling in parallel perpendicular;

a second light polarization controller, which is disposed between the light displacement controller and the second light split/combine controller for making two beams with perpendicular polarization direction travel in parallel and for making the polarization direction of the two beams traveling in parallel perpendicular; and a light traveling direction changer, which is a reflector disposed after the light displacement controller to reflect the beam and to change its traveling direction;

wherein one portion of one surface of the reflector is coated with an HR film and another portion is coated with an AR film, and the other surface as a whole is coated with an HR film, the round trip distance between the two surfaces being equal to the optical path difference in the first light split/combiner controller between the O-ray and the E-ray entering from the first port to the second port.

2. The optical circulator of claim 1, wherein at least one of the first light split/combine controller and the second light split/combine controller is a birefringent crystal.

3. The optical circulator of claim 1, wherein the light displacement controller is a birefringent crystal.

4. The optical circulator of claim 1, wherein the first light polarization controller is a combination of reciprocal crystals and non-reciprocal crystals.

5. The optical circulator of claim 4, wherein the reciprocal crystal of the first light polarization controller is a half-wave plate.

6. The optical circulator of claim 4, wherein the non-reciprocal crystal of the first light polarization controller is a Faraday rotator.

7. The optical circulator of claim 1, wherein the first light polarization controller contains two non-reciprocal crystals with opposite polarization rotating directions.

8. The optical circulator of claim 7, wherein the non-reciprocal crystal is a Faraday rotator.

9. The optical circulator of claim 1, wherein the second light polarization controller is a combination of reciprocal crystals and non-reciprocal crystals.

10. The optical circulator of claim 9, wherein the reciprocal crystal of the second light polarization controller is a half-wave plate.

11. The optical circulator of claim 9, wherein the non-reciprocal crystal of the second light polarization controller is a Faraday rotator.

12. The optical circulator of claim 1, wherein the second light polarization controller contains two non-reciprocal crystals with opposite polarization rotating directions.

13. The optical circulator of claim 12, wherein the non-reciprocal crystal is a Faraday rotator.

14. An optical circulator for transmitting light beams in circulation, comprising:

a beam input having a first port and a second port;

a beam output having a third port;

a first light split/combine controller disposed between the beam input and the beam output, said first light split/combine controller comprising a first light split controller and a first light combine controller for separating a beam into an E-ray and an O-ray with perpendicular polarization directions and for combining the E-ray and O-ray with perpendicular polarization directions into one beam, respectively;

a light displacement controller, which is disposed after the first light split controller and first light combine controller, to selectively induce a lateral displacement;

a second light split/combine controller disposed between the light displacement controller and the beam output, said second light split/combine controller comprising a second light split controller and second light combine controller for separating a beam into an E-ray and an O-ray with perpendicular polarization directions and for combining the E-ray and O-ray with perpendicular polarization directions into one beam, respectively;

a first light polarization controller, which is disposed between the first light split/combine controller and the light displacement controller for making two beams with perpendicular polarization directions travel in parallel and for making the polarization directions of the two beam traveling in parallel perpendicular;

a second light polarization controller, which is disposed between the light displacement controller and the second light split/combine controller for making two beams with perpendicular polarization direction travel in parallel and for making the polarization direction of the two beams traveling in parallel perpendicular; and a light traveling direction changer, which is a reflector disposed behind the light displacement controller to reflect the beam and to change its traveling direction;

wherein the reflector is coated with an HR film and a crystal with a refraction index larger than 1 is disposed between the first light split/combine controller and the reflector.

15. The optical circulator of claim 14, wherein at least one of the first light split/combine controller and the second light split/combine controller is a birefringent crystal.

16. The optical circulator of claim 14, wherein the light displacement controller is a birefringent crystal.

17. The optical circulator of claim 14, wherein the first light polarization controller is a combination of reciprocal crystals and non-reciprocal crystals.

18. The optical circulator of claim 17, wherein the reciprocal crystal of the first light polarization controller is a half-wave plate.

19. The optical circulator of claim 17, wherein the non-reciprocal crystal of the first light polarization controller is a Faraday rotator.

20. The optical circulator of claim 14, wherein the first light polarization controller contains two non-reciprocal crystals with opposite polarization rotating directions.

21. The optical circulator of claim 20, wherein the non-reciprocal crystal of the first light polarization controller is a Faraday rotator.

22. The optical circulator of claim 14, wherein the second light polarization controller is a combination of reciprocal crystals and non-reciprocal crystals.

23. The optical circulator of claim 22, wherein the reciprocal crystal of the second light polarization controller is a half-wave plate.

24. The optical circulator of claim 22, wherein the non-reciprocal crystal of the second light polarization controller is a Faraday rotator.

25. The optical circulator of claim 14, wherein the second light polarization controller contains two non-reciprocal crystals with opposite polarization rotating directions.

26. The optical circulator of claim 25, wherein the non-reciprocal crystal of the second light polarization controller is a Faraday rotator.

* * * * *